United States Patent [19]

Provost et al.

[11] Patent Number: 4,535,858

[45] Date of Patent: Aug. 20, 1985

[54] WEIGHING SCALE FOR INDIVIDUAL WHEELS OF A TANDEM SET OF WHEELS

[75] Inventors: Pierre Provost, Vauquor; Jean T. Bédard, Barfleur, both of Canada

[73] Assignee: Vaqua Pneumatique, Quebec, Canada

[21] Appl. No.: 593,935

[22] Filed: Mar. 27, 1984

[30] Foreign Application Priority Data

Dec. 9, 1983 [CA] Canada .................................... 442926

[51] Int. Cl.³ ...................... G01G 19/02; G01G 21/24
[52] U.S. Cl. ...................................... 177/134; 177/255
[58] Field of Search ................ 177/134, 135, 145, 163, 177/255

[56] References Cited

U.S. PATENT DOCUMENTS

| | | | |
|---|---|---|---|
| 3,835,945 | 9/1974 | Yamanaka et al. | 177/134 |
| 3,935,914 | 2/1976 | Nordstrom et al. | 177/134 |
| 4,098,365 | 7/1978 | Pietzsch et al. | 177/134 X |
| 4,192,394 | 3/1980 | Simpson | 177/134 X |
| 4,281,728 | 8/1981 | Dickason et al. | 177/134 |
| 4,339,010 | 7/1982 | Malikov et al. | 177/255 X |

Primary Examiner—George H. Miller, Jr.
Attorney, Agent, or Firm—Oblon, Fisher, Spivak, McClelland & Maier

[57] ABSTRACT

The disclosure teaches a weighing scale for weighing, individually, the loads on each of the wheels of sets of wheels which are mounted on an axle of a moving vehicle, for example, a truck. The wheels are in side-by-side relationship at either end of each axle and move along a surface plane in a direction transverse to the axis of the axle. The scale includes a weighing beam supported in the surface plane and having at least one side edge at an oblique angle to the direction of travel. Weight detectors underlie and support the weighing beam and comprise the sole support of the weighing beam. In one embodiment, the weighing beam is rectangular in shape and there is a weight detector at either end of the beam. In a further embodiment, the weighing beam is triangular in shape and there is a weight detector at each corner of the weighing beam. In a still further embodiment, a wheel position detector is provided to detect that a wheel is at a weighing position on the beam or about to arrive at this position.

11 Claims, 9 Drawing Figures

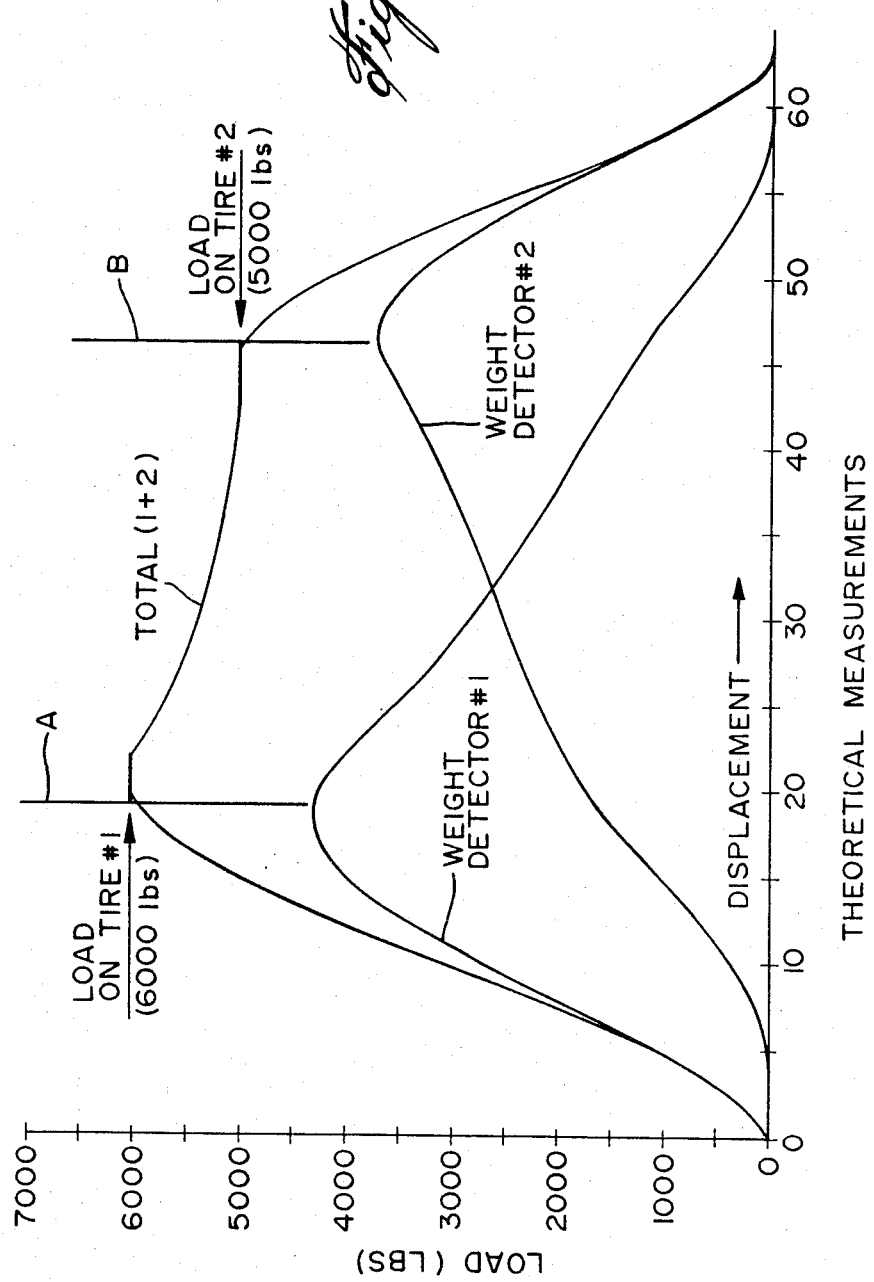

ACTUAL MEASUREMENTS

WEIGHING SCALE FOR INDIVIDUAL WHEELS OF A TANDEM SET OF WHEELS

BACKGROUND OF INVENTION (a) Field of the Invention

The invention relates to a weighing scale for weighing the loads on individual wheels of mobile vehicles, for example, trucks. More specifically, the invention relates to a weighing scale for weighing, individually the loads on the wheels of sets of wheels mounted at each end of an axle in side-by-side relationship.

(b) Description of Prior Art

Weighing scales for weighing the loads on wheels of trucks are known in the art. One such weighing scale is illustrated in Canadian Pat. No. 537,891 to Reiser, issued Mar. 5, 1957. Although the Reiser patent alleges that it can weigh the load on each wheel separately, it can be seen from the patent that, when there are sets of wheels at either end of the axle, the weighing scale can only weigh the load on such set of wheels, at any one time. It cannot weigh the load on each wheel of a set of wheels.

SUMMARY OF INVENTION

It is therefore an object of the invention to provide a weighing scale which overcomes the shortcoming of the prior art.

It is a further object of the invention to provide a weighing scale which can weigh, the loads on individual wheels of sets of wheels mounted in side-by-side relationship on each end of an axle.

The advantage of weighing the load on each wheel of a set of wheels is to determine if the load on the set of wheels is supported substantially equally by all wheels or if one wheel is carrying more of the load than the other. If one wheel is carrying more of the load, then the wheels are verified to determine if they have sufficient air in its tire or if the tire characteristics are improperly matched. The result in obtaining equilibrium of the load on all wheels of sets of wheels, is that tire wear is minimized, the danger of tire explosion is reduced, and there is better assurance of the vehicle reaching its destination without stopping for repair. In conclusion, the maintenance cost is reduced, as well as the accident risk.

In accordance with the invention, from a broad aspect, there is provided a weighing scale for weighing, individually, the loads on the wheels of sets of wheels of a vehicle mounted in side-by-side relationship at opposed ends of an axle for movement along a surface plane in a direction transverse to the axis of the axle. The scale comprises a weighing element arranged substantially in said surface plane and having at least one side edge at an oblique angle to the direction of travel. The weighing element being supported, in a vertical sense, solely by the weight detector means which underly the weighing element.

BRIEF DESCRIPTION OF DRAWINGS

The invention will be better understood by an examination of the following description, together with the accompanying drawings, in which:

FIG. 2 is a graph illustrating theoretical signals when a set of wheels are displaced across the weighing element;

DESCRIPTION OF PREFERRED EMBODIMENTS

The weighing scale of the present invention can be used for weighing the loads on individual wheels of mobile vehicles, for example, trucks, when each axle carries only a single wheel at either end thereof. However, the invention is particularly useful for measuring the loads of individual wheels of a pair of wheels at either end of the vehicle axle.

Figure 1:
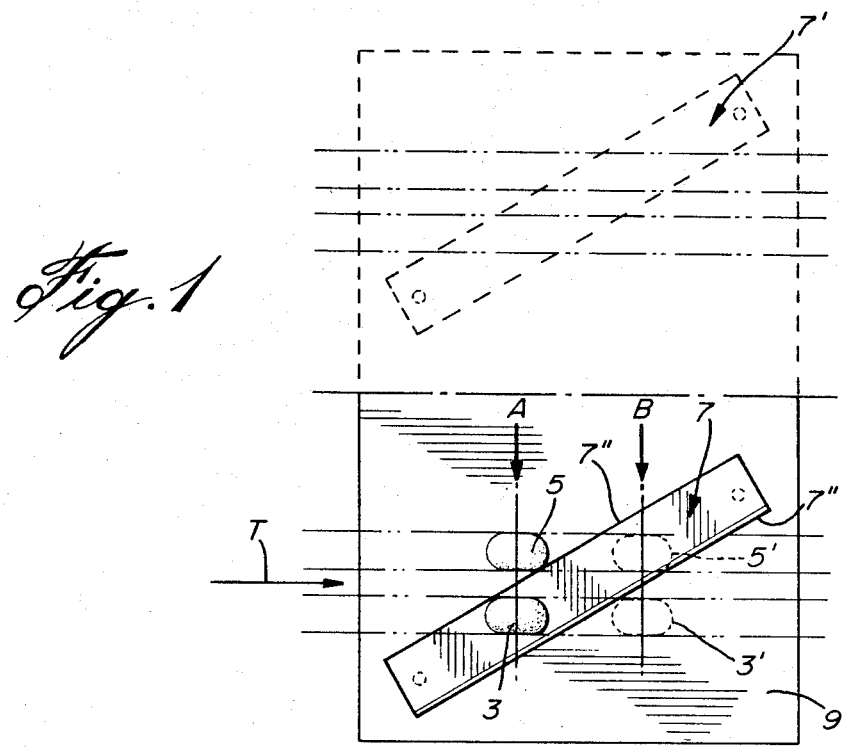
FIG. 1 is a schematic illustration of the weighing element disposed in a surface plane.

The ground imprint of a pair of wheels are illustrated at 3 and 5 in FIG. 1. The pair of wheels comprises a first wheel 33 shown by ground imprint 3 and a second wheel 35 shown by ground imprint 5. The wheels are, of course, mounted at one end of an axle (not shown) in side-by-side relationship.

Referring still to FIG. 1, the weighing scale of the present invention comprises a weighing element constituted by a weighing beam 7. As can be seen, at least one edge of the weighing beam 7, that is, the forward edge 7", is at an oblique angle to the direction of travel of the vehicle whose load is to be weighed, the direction of travel being illustrated in FIG. 1 by the arrow T.

Figure 4:
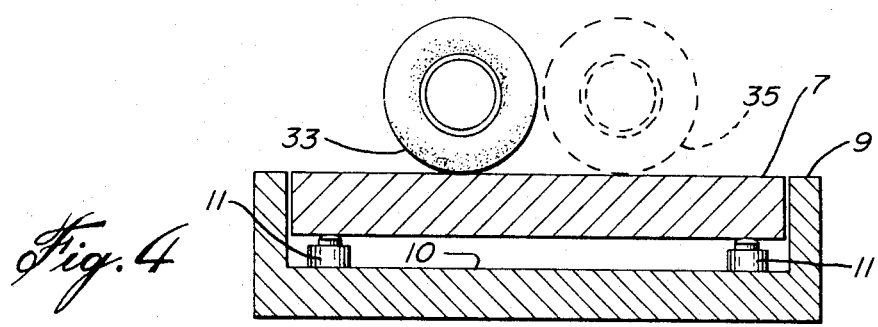
FIG. 4 is a cross-section through a weighing beam in FIG. 1.

The vehicle would travel over a surface 9, and, as can be seen in FIGS. 1 and 4, the top of the weighing beam 7 is substantially at the same level as the surface 9.

FIGS. 1 and 4 illustrate a pair of wheels in two different positions, A and B. As can be seen, when the pair of wheels is in the position A, then only the wheel 33 is on the weighing beam so that only the load on the wheel 33 will be weighed. When the tandem pair is in position B, only wheel 35 is on the weighing beam so that only its load will be measured.

Electronics circuits are used to effect the measurements and recordings and they are programmed in accordance to the geometric configuration of the particular weighing scale design.

A weighing system in accordance with the invention includes two weighing scales comprised by two weighing beams 7 and 7'. Each weighing beam will weigh individual wheels at respective ends of the truck axles while the truck moves over the beams 7 and 7' without stopping. Obviously, the scale can also be used in a static mode by having the vehicle stop at precise locations over the scale, when desired.

The weighing beam, as shown in FIG. 4, is supported embedded in a pit 10, and is supported solely by the weight detectors 11. In the FIG. 4 embodiment, a weight detector 11 is disposed at either end of the weighing beam.

Figure 3:
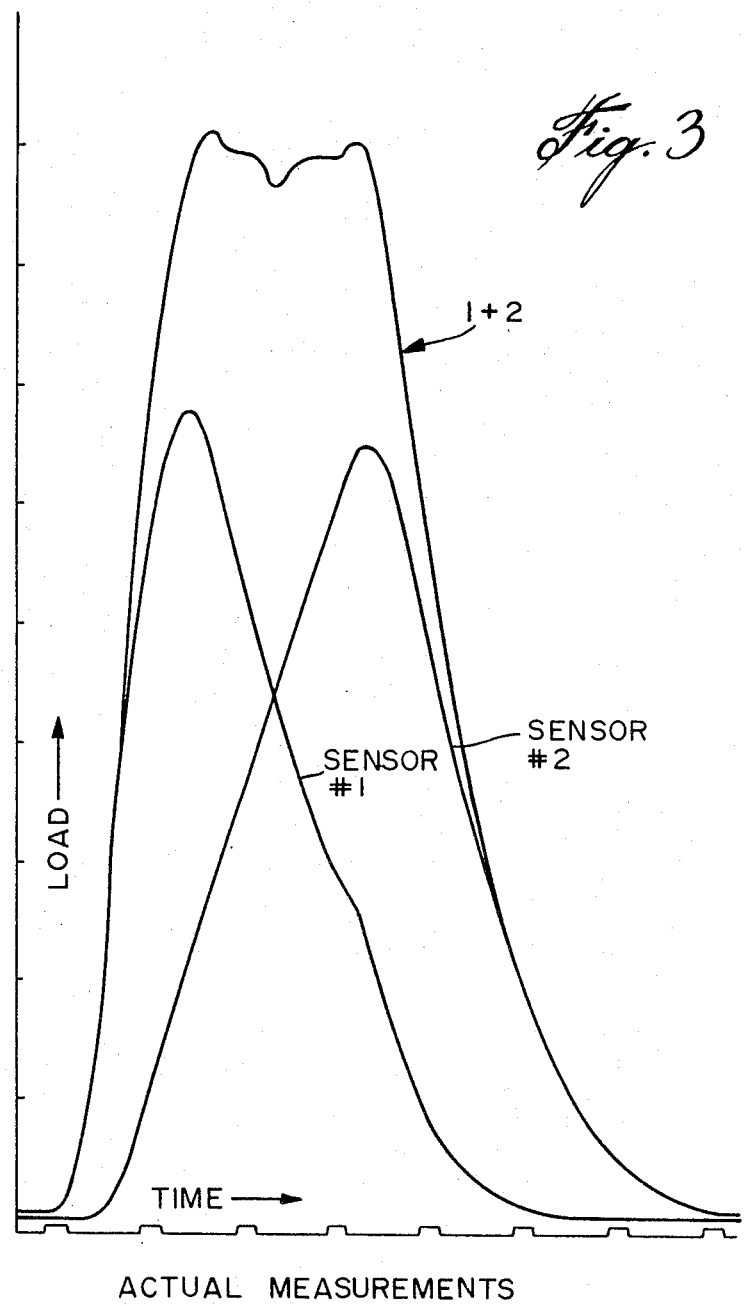
FIG. 3 is a graph illustration of an actual output of the load sensor signals associated with the weighing element.

Referring now to FIGS. 2 and 3, there is illustrated a typical theoretical case and an actual measurement of the load of individual ones of the wheels 33 and 35 of the set of wheels. As shown in FIG. 2, the output of each weight detector 11, herein referred to as weight detector 1 and weight detector 2 is connected to an indicator device 27 which is provided with electronics circuits to effect the measurements and recordings of the load sensed by each detector as each wheel of set of wheels is displaced over the weighing beam. Assuming the set of wheels is displaced along the traces of the imprints 3 and 5, as shown in FIG. 1, at the instant the wheel 33 touches the scale, the first weight detector closest to the wheel will generate a signal indicating a load as shown by the curve identified "weight detector No. 1". The other weight detector 2 will also indicate a load but lesser as it is located more remote from wheel 33. The first weight detector 11 generates a stronger signal as it is closest to wheel 33. At position A, the wheel 33 (imprint 3) is totally supported by the weighing beam and solely on the weighing beam. This is the position where the signal of the first weight detector is strongest and where a reading of the total signal (detectors 1 and 2) is taken to determine the load on wheel 33.

The second wheel is then displaced on the weighing beam causing the signal of the second weight detector to keep augmenting while the signal of the first weight detector will start declining as the wheel 33 leaves the weighing beam. The weight detector No. 2 will reach a peak signal at position B when the second wheel 35 (imprint 5') reaches a position totally and solely on the beam and closest to the weight detector No.2.

As can be seen from FIG. 2, a further signal is tabulated providing the total load herein represented by the curve identified total (1+2). This total load signal illustrates in the example of FIG. 2 that when the weight detector No. 1 signal was strongest there was 6,000 pounds on that wheel. However, at position B the second weight detector shows that the load was only 5,000 pounds. Accordingly, there was an imbalance between the loads on each of the tires indicating that the wheel 33 supported a greater load, herein 1,000 more pounds. This signifies that verification of both tires is required to determine if there is insufficient air in the tires or if the tires of both wheels are improperly matched.

FIG. 3 illustrates actual experimental curves which were plotted as a set of wheels was displaced across the weighing beam. It is seen that these curves stretch out more towards their termination as the speed of the vehicle displacing it across the weighing beam was not constant. If the speed was constant, we would obtain a curve which is more along the lines of the theoretical curves shown in FIG. 2.

In conclusion, by positioning the weighing beam at a diagonal position, it is possible to determine the load on each wheel of a set of wheels at each end of an axle of a vehicle as illustrated by the graph results shown in FIGS. 2 and 3.

Figure 5:
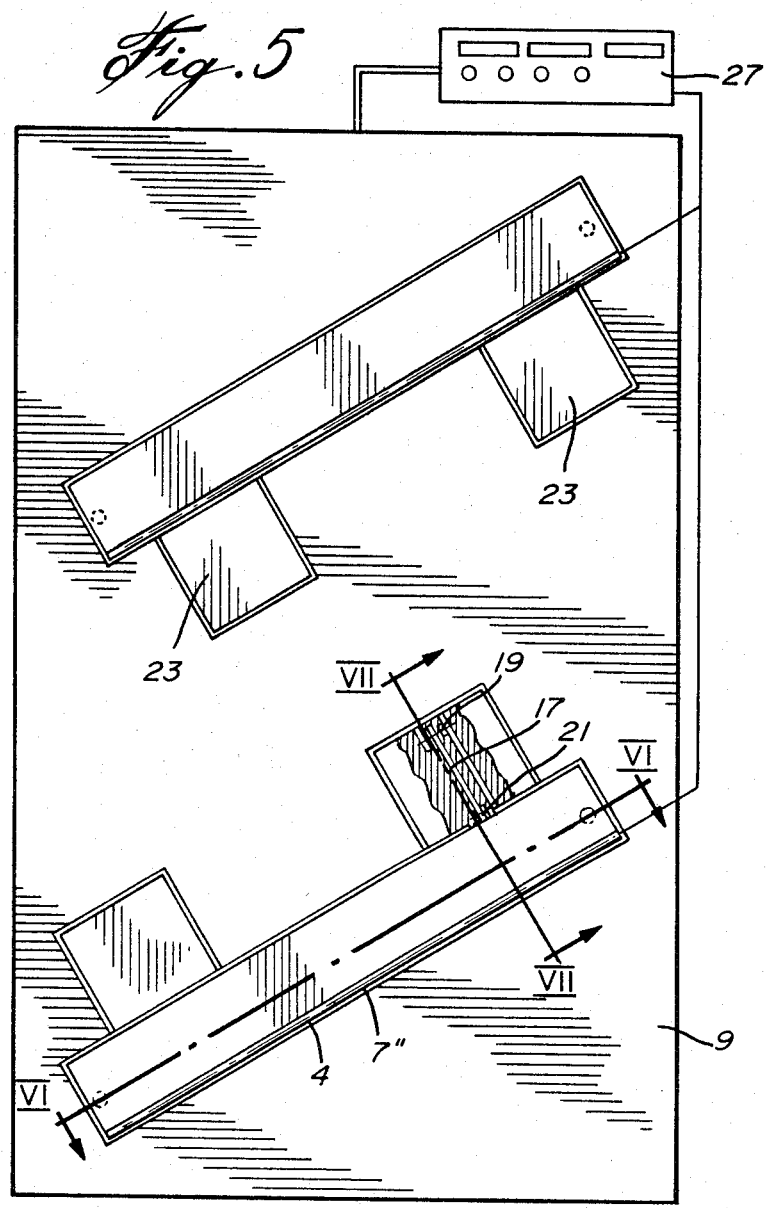
FIG. 5 illustrates an embodiment of the invention in greater detail.
Figure 6:
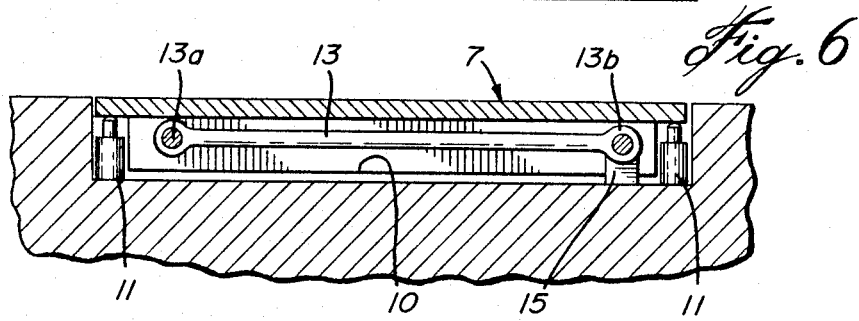
FIG. 6 is a cross-section through section lines VI—VI of FIG. 5.
Figure 7:
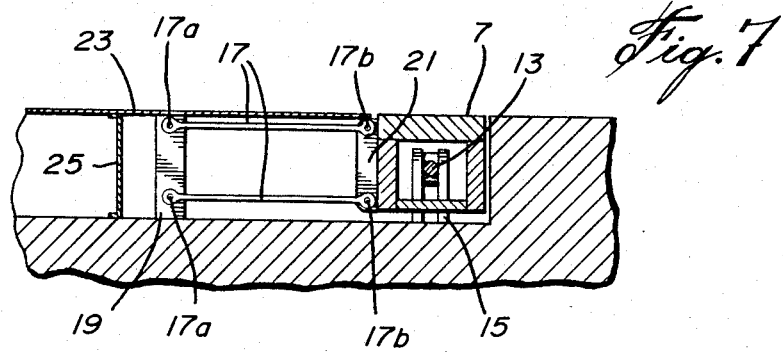
FIG. 7 is a cross-section through section lines VII—VII of FIG. 5.

We will now describe in more details, the construction of the weighing scale and modifications thereof with reference to FIGS. 5, 6 and 7. In order to prevent horizontal movement of the beam, there is provided a reaction rod 13 pivotally connected at one end 13a thereof to the weighing beam 7, and the other end 13b to a fixed member 15. With the reaction rod as illustrated, the weighing beam can still move vertically, however, movement in one horizontal direction is prohibited. Movement in the transverse horizontal direction is prevented by the further set of rods 17 pivotally connected at both ends, as illustrated in FIG. 7.

In one embodiment, it is required to have a wheel position detector for use in association with the weighing scale. Such a wheel position detector may consist of a load detecting pneumatic sensing cable 4 positioned along the exit edge 7" of the weighing beam 7 to provide a signal when the tire is in a proper position on the surface of the beam to take a reading.

Figure 8:
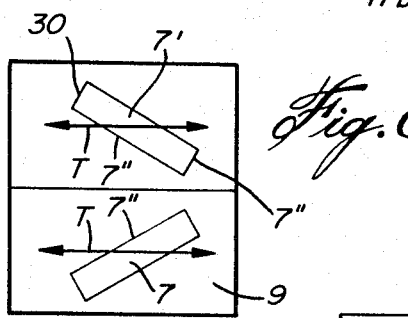
FIG. 8 illustrates an alternate embodiment of the invention.

As shown in FIG. 1, the weighing beams 7 and 7' are arranged in parallel, that is, they are disposed at the same oblique angle to the direction of travel T of the truck. An alternate arrangement for a weighing system is illustrated in FIG. 8. As can be seen, the weighing beams 7 and 7' are still at oblique angles to the direction of travel T but disposed in the form of a V. In fact both beam version and triangle version scales can have their oblique sides arranged either parallel or in the form of a V.

In the above embodiments, the weighing beams are rectangular in shape. In an alternate embodiment illustrated in FIG. 9, the weighing beams 7 and 7' are somewhat triangular in shape. The front side edge 31 of the weighing beam is at an oblique angle to the direction of travel T of the vehicle.

Figure 9:
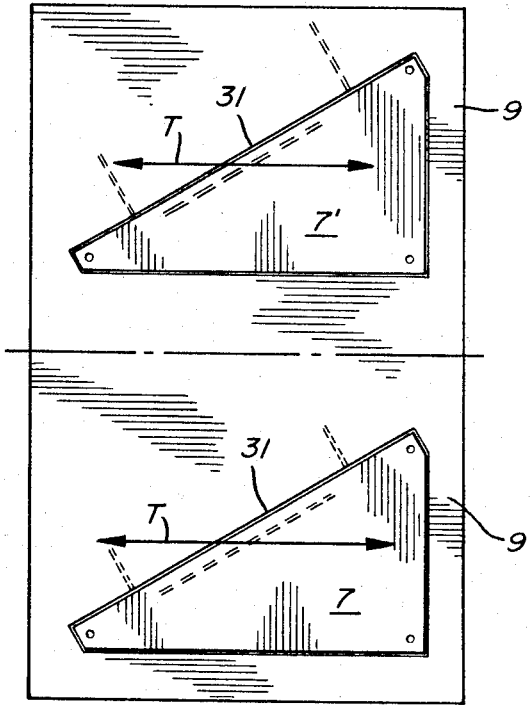
FIG. 9 illustrates a still further embodiment of the invention.

With the embodiment illustrated in FIG. 9, there is no requirement for as many reaction rods. Instead, weight detectors would be disposed at each of the corners of the triangle and the weight detectors would thereby assure stability (rotational).

Returning to FIG. 5, the weight detectors are connected by means, not shown to a computer device 27 which provides an analog read-out of the load on each wheel.

Although particular embodiments have been described, this was for the purpose of illustrating, but not limiting, the invention. Various modifications, which will come readily to the mind of one skilled in the art, are withing the scope of the invention as defined in the appended claims.

We claim:

1. A weighing scale for weighing, individually the loads on the wheels of a set of wheels of a vehicle mounted at either end of an axle in side-by-side relationship for movement along a weighing surface in a direction transverse to the axis of the axle, said scale comprising:
    a weighing element arranged substantially in said surface plane and having at least one side edge at an oblique angle to said direction of travel;
    said weighing element being supported, in a vertical sense, solely by weight detector means.

2. A weighing scale as defined in claim 1 wherein there is further comprised a wheel position detector positioned along a side edge of said weighing beam to provide a signal indicative of the position of a wheel.

3. A weighing system comprising two side-by-side weighing scales as defined in claim 1 and spaced apart a distance to permit said load on individual wheels of set of wheels at opposed ends of a vehicle axle to be weighed, said oblique angle of said weighing elements permitting said weighing to be made without requiring precise alignment of the vehicle as it passes over said weighing scales.

4. A weighing scale as defined in claim 1 wherein said weighing element is a triangular beam and a side edge of said beam being disposed at an oblique angle.

5. A weighing scale as defined in claim 4 wherein said weight detector means comprises three weight detectors, a respective weight detector being disposed at a respective corner of said triangle.

6. A weighing scale as defined in claim 1 wherein said weighing element is supported on two or more weight detectors, each said detector being spaced apart and providing signals indicative of a load thereon resulting from the displacement of said set of wheels over said weighing element, and electronics circuit means for processing said signals.

7. A weighing scale as defined in claim 6 wherein said weighing element is a rectangular beam, one of said weight detectors being positioned at a respective end of said beam, each said detector providing signals indicative of the load sensed by the detectors at their respective ends of said beam.

8. A weighing scale as defined in claim 1 wherein said weighing element is a rectangular beam.

9. A weighing scale as defined in claim 2 wherein said weight detector means comprises two weight detectors, a respective one of said weight detectors being disposed at a respective end of said weighing beam.

10. A weighing scale as defined in claim 9 and including means for preventing any horizontal movement of said weighing beam while permitting free vertical movement thereof.

11. A weighing scale as defined in claim 10 wherein said means for preventing horizontal movement comprises a set of reaction rods fixed at one end thereof to an elongated side edge of said weighing beam and pivotally connected, at the other end thereof, to a fixed member, and a further reaction rod pivotally connected at one end to said weighing beam and at an opposed end to a fixed member and extending along the longitudinal axis of said weighing beam.

* * * * *